Dec. 8, 1953  R. M. VIRKUS ET AL  2,662,205
CONSTANT SPEED DIRECT CURRENT MOTOR
Filed Jan. 20, 1951  4 Sheets-Sheet 1

INVENTORS:
ROBERT M. VIRKUS
MYRON L. ANTHONY
BY
Wallenstein & Spangenberg
ATT'YS Dec. 8, 1953  R. M. VIRKUS ET AL  2,662,205
CONSTANT SPEED DIRECT CURRENT MOTOR
Filed Jan. 20, 1951  4 Sheets-Sheet 2

INVENTORS:
ROBERT M. VIRKUS
MYRON L. ANTHONY
BY
Wallenstein + Spangenberg
ATT'YS Dec. 8, 1953  R. M. VIRKUS ET AL  2,662,205
CONSTANT SPEED DIRECT CURRENT MOTOR
Filed Jan. 20, 1951  4 Sheets-Sheet 3

INVENTORS:
ROBERT M. VIRKUS
MYRON L. ANTHONY
BY
Wallenstein + Spangenberg
ATT'YS

INVENTORS:
ROBERT M. VIRKUS
MYRON L. ANTHONY

Patented Dec. 8, 1953

2,662,205

UNITED STATES PATENT OFFICE

2,662,205

CONSTANT SPEED DIRECT CURRENT MOTOR

Robert M. Virkus, Riverside, and Myron L. Anthony, La Grange, Ill.

Application January 20, 1951, Serial No. 206,984

26 Claims. (Cl. 318—330)

This invention relates to D. C. motors and more particularly to constant speed D. C. motors.

The principal object of this invention is to provide an improved constant speed D. C. motor wherein the motor speed remains substantially constant over wide ranges of load and applied voltage changes, wherein extraneous equipment such as escapements, brakes and electronic controls are dispensed with, wherein the means for maintaining constant speed are incorporated directly in the motor structure and form an integral part thereof, and wherein the motor may be readily and inexpensively manufactured.

In carrying out this object of the invention the constant speed D. C. motor includes a field structure having a magnetic circuit including opposed poles and windings for the magnetic circuit energizable from a D. C. voltage source. It also includes a rotatable armature having opposed poles and windings for the poles energizable from a D. C. voltage source. The armature poles are magnetically associated with and affected by the field poles. The motor further includes a commutator for the armature windings to cause the armature poles magnetically to cooperate with the field poles for rotating the armature. The motor also includes a vibrating mechanism for mechanically vibrating at least a portion of the magnetic circuit of the field structure at a fixed frequency for varying at a fixed frequency the magnetic force between the field poles and the armature poles to cause the armature to rotate in synchronism with the vibrating mechanism.

The motor may be of the series, shunt or compound type. The field structure may include any desired number of opposed field poles, one pair of opposed field poles being disclosed herein by way of example. Also, the armature may include any desired number of opposed armature poles, two and three pairs being disclosed herein by way of example.

The vibrating mechanism may take the form of a vibrating fork which carries at its forked ends the field poles of the field structure. The field poles are mechanically vibrated by the vibrating fork to "in" and "out" positions, that is, toward and away from the armature poles at a fixed frequency, which is the natural frequency of the vibrating fork. The fork is vibrated by the reaction of the field poles with the armature poles during rotation of the armature. When the field poles are in the "in" position, the magnetic force between the field poles and armature poles is relatively great, and when the field poles are in the "out" position the magnetic force therebetween is relatively less. This cyclical varying of the magnetic force between the field and armature poles causes the armature to operate in synchronism with the vibrating fork and thus causes it to operate at constant speed. In a motor having one pair of field poles and two pairs of armature poles the armature will make one complete revolution for each four cycles of vibration of the vibrating fork. If the motor has three pairs of armature poles, the armature will make one complete revolution for each six cycles of vibration of the vibrating fork.

In the event that the motor should tend to slow down, the phase position of the armature will tend to shift toward a position wherein the armature poles line up with the field poles when the field poles are in the "in" position. This increases the field strength, i. e., the magnetic force between the armature and field poles at this point, and hence the torque to overcome the motor retarding effect. Conversely, if the motor should tend to speed up, the phase position of the armature will tend to shift toward a position wherein the armature poles line up with the field poles when the field poles are in the "out" position. This decreases the field strength at this point and hence the torque to overcome the speeding up effect. In operation, the armature operates at constant speed in synchronism with the vibrating fork and the phase position of the armature remains between the two limiting positions discussed immediately above.

The amplitude of vibration of the vibrating fork is dependent upon the magnetic reaction between the field and armature poles which in turn is dependent upon the voltage, current and load upon the motor. While in theory a tuning fork freely vibrates at substantially a fixed frequency regardless of amplitude of vibration, it is found that wide changes in voltage, current or load, which cause the magnetic reaction between the field and armature poles and hence the amplitude of vibration of the vibrating fork to vary, also cause the frequency of vibration of the fork and hence the speed of the motor to vary slightly. To maintain the amplitude of vibration of the fork and hence the speed of the motor within close limits means are provided for cyclically decreasing the magnetic force between the field and armature poles in proportion to the amplitude of vibration of the fork. This means may include a switch means operated by the fork for cyclically decreasing the D. C. voltage applied to the motor windings. For example, it is found that with a substantially constant load on the motor of this invention and with an applied voltage change of 3 to 1, the speed of the motor remains constant within .02 per cent. The switch means may be included in series with the field windings, the armature windings or both and may operate cyclically to connect a resistance in series therewith. Alternatively, the switch means operated by the fork may cyclically reverse the voltage applied to the field windings or it may cyclically energize bucking windings in the field structure. The switch means may be operated on the outswing or on the inswing of the vibrating fork.

The vibrating fork itself may form the magnetic path of the field structure or it may be separate therefrom. In the latter arrangement, a core carrying the field windings may be magnetically associated with the field poles vibrated by the fork, the core forming the magnetic path for the field poles. Instead of using a fork for vibrating the pair of opposed field poles, one of the field poles may be stationary and the other vibrated by a reed at fixed frequency. Instead of vibrating the field poles, they may be stationarily mounted and the magnetic path of the field structure may be provided with a gap. In this arrangement, a magnetic bridging member may be provided for the gap and mechanically vibrated at a fixed frequency for cyclically varying the magnetic reaction between the field and armature poles.

The brushes of the commutator for the armature may be cross connected for reversing the current in the armature windings when the armature poles line up with field poles. In this way the armature poles are magnetically attracted by the field poles until the armature and field poles line up and then the armature poles are magnetically repelled by the field poles. This provides continuing torque for the armature and produces forces in both directions for vibrating the fork.

Further objects of this invention reside in the details of construction of the constant speed D. C. motor and the cooperative relationship between the component parts thereof.

Other objects and advantages of this invention will become apparent to those skilled in the art upon reference to the accompanying specification, claims and drawings, in which:

Figure 1:
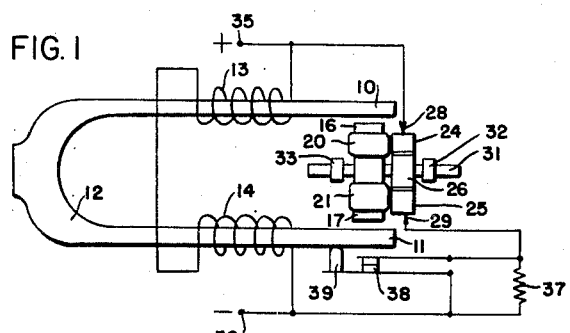
Fig. 1 is a diagrammatic illustration of one form of this invention wherein the field poles are vibrated by a fork, wherein the fork forms the magnetic path of the field structure, wherein the motor is connected as a shunt type motor, and wherein the switch means is in series with the armature windings.
Figure 2:
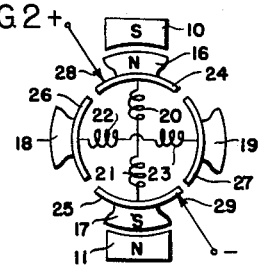
Fig. 2 is an end elevational view of Fig. 1, diagrammatically illustrating the motor of Fig. 1.

Referring first to Figs. 1 and 2 of the drawings, the field structure of the motor includes a pair of field poles 10 and 11 integral with a vibrating fork 12. The vibrating fork 12 forms the magnetic path of the field structure. Field windings 13 and 14 are carried by the legs of the fork 12 and are so arranged as to make the pole 10 north and the pole 11 south. The field windings 13 and 14 are connected in series with each other across a source of D. C. potential 35, 36.

The armature includes two pairs of opposed armature poles 16, 17 and 18, 19. Armature windings 20, 21, 22 and 23 are associated with the armature poles 16, 17, 18 and 19, respectively, and are connected to commutator segments 24, 25, 26 and 27, respectively. The commutator segments are engaged by brushes 28 and 29 which, in turn, are connected to the source of D. C. potential 35, 36. The armature windings are connected in parallel with the field windings to form a shunt type motor.

As shown in Fig. 2, the brushes 28 and 29 are engaging the commutator segments 24 and 25 and, as a result, the armature pole 16 is north and the armature pole 17 is south. The armature poles 16 and 17 are being attracted by the field poles 10 and 11. The motor is rotating in a clockwise direction. As the motor continues to operate, the commutator segments 24 and 25 disengage the brushes 28 and 29, and the brushes are then engaged by commutator segments 26 and 27, respectively. As a result the armature pole 18 is made north, while the armature pole 19 is made south so that they are magnetically attracted, respectively, by the field poles 10 and 11. This causes continued rotation of the armature.

As the armature rotates, the armature and field poles magnetically react to cause the fork 12 to be vibrated and when this occurs the fork tends to vibrate at its natural frequency. In this way the field poles 10 and 11 are mechanically vibrated by the vibrating fork to "in" and "out"

positions, that is, toward and away from the armature poles at a substantially fixed frequency which is the natural frequency of the vibrating fork 12. When the field poles 10 and 11 are in the "in" position, the magnetic force between the field poles and the armature poles is relatively great and, conversely, when the field poles are in the "out" position, the magnetic force is relatively less. This cyclical varying of the magnetic force between the field and armature poles causes the armature to operate in synchronism with the vibrating fork and, since the vibrating fork operates at a constant frequency, the armature is driven at a constant speed. Since the motor illustrated in Figs. 1 and 2 has one pair of field poles and two pairs of armature poles, the armature will make one complete revolution for each four cycles of vibration of the vibrating fork.

If the motor should tend to slow down, the phase position of the armature will tend to shift toward a position wherein the armature poles line up with the field poles when the field poles are in the "in" position. This increases the field strength, that is, the magnetic force between the armature and field poles at this point and hence the torque to overcome the motor retarding effect. Conversely, if the motor should tend to speed up, the phase position of the armature will tend to shift in the opposite direction toward a position where the armature poles line up with the field poles when the poles are in the "out" position. This decreases the field strength at this point and hence the torque to overcome the speeding up effect. In operation, the armature operates at a constant speed in synchronism with the vibrating fork and the phase position of the armature remains between these two limiting positions. The amplitude of vibration of the vibrating fork 12 is dependent upon the magnetic reaction between the field and armature poles which, in turn, is dependent upon the voltage, current and load upon the motor. It is found that wide changes in voltage, current or load, which cause the magnetic reaction between the field and armature poles and hence the amplitude of vibration of the vibrating fork to vary, also cause the frequency of vibration of the fork and hence the speed of the motor to vary slightly. To maintain the amplitude of vibration of the fork 12 and hence the speed of the motor within close limits, means are provided for cyclically decreasing the magnetic force between the field and armature poles in proportion to the amplitude of vibration of the fork. In this respect, in Fig. 1, a resistance 37 is connected in series with the armature windings and a switch means 38 is connected in parallel with the resistance 37. The switch means includes a button 39 operated by the vibrating fork 12 on its outswing. Thus, each time that the fork 12 vibrates outwardly, the switch means 38 is opened to place the resistance 37 in series with the armature windings. When this occurs the magnetic force between the field and armature poles is reduced. The amount of time in each cycle that the resistance 37 is connected in series with the armature windings is proportional to the amplitude of vibration of the fork 12. Thus, the resistance 37 and the switch means 38 operate as a limiter for limiting the amplitude of vibration of the fork 12. In this way, the frequency of vibration of the fork 12 and hence the speed of rotation of the motor are maintained within very close limits. It has been found that with a substantially constant load on the motor of this invention and with an applied voltage change of 3 to 1 (8 volts to 24 volts), the speed of the motor remains constant within .02 per cent. For small voltage changes of the type normally encountered, the speed of the motor for all intents and purposes is constant.

Figure 5:
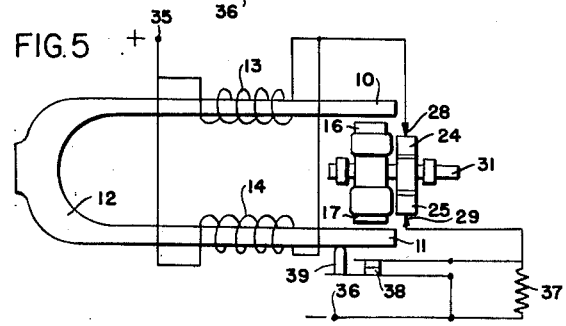
Fig. 5 is a view similar to Fig. 1, but illustrating the motor connected as a series motor with the switch means in series with both the field and armature windings.
Figure 4:
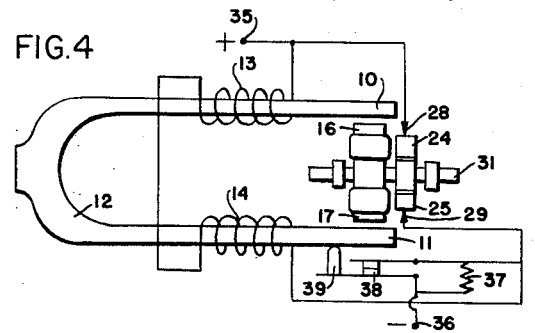
Fig. 4 is a view similar to Fig. 1 but showing the switch means in series with both the field and armature windings.
Figure 3:
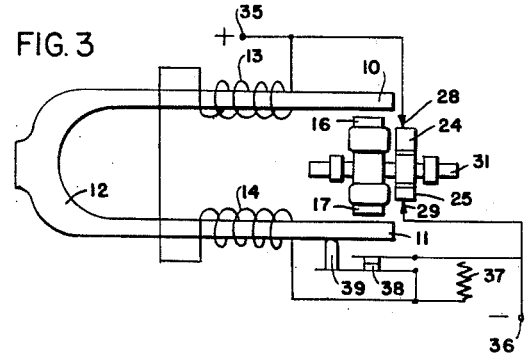
Fig. 3 is a view similar to Fig. 1 but showing the switch means in series with the field windings.

In the form of the invention illustrated in Fig. 3, the resistance 37 and limiter switch means 38 is connected in series with the field windings rather than the armature windings. In Fig. 4, the resistance 37 and limiter switch means 38 are connected in series with both the field and armature windings. In Fig. 5, the field windings 13 and 14 are connected in parallel and in series with the armature windings so that the motor of Fig. 5 is a series type motor rather than a shunt type. In this arrangement the resistance 37 and the limiter switch means 38 are connected in series with the field and armature windings. The manner of operation of the motors of Figs. 3, 4 and 5 is the same as that described above in connection with Figs. 1 and 2.

Figure 6:
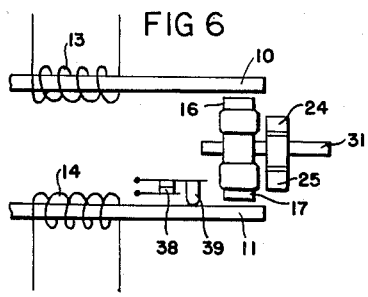
Fig. 6 is a partial diagrammatic illustration similar to Fig. 1 but showing the switch means operated by the "in" stroke of the vibrating fork.

In Fig. 6, the switch means 38 is operated by a button 39 which in turn is engaged by the fork 12 on its inswing rather than on its outswing. Substantially the same operation as described above is obtained by this arrangement of the switch means. Perhaps a slight advantage is present in the arrangement of Fig. 6 in that there is a more positive limiting of the inward motion of the field poles 10 and 11.

Figure 7:
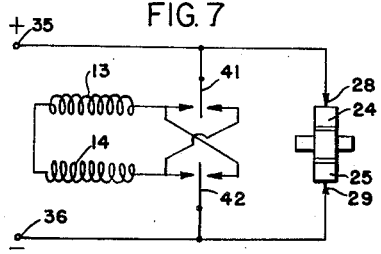
Fig. 7 is a partial diagrammatic view illustrating the manner in which the switch means may cyclically reverse the polarity of the field coils.

In the arrangement illustrated in Fig. 7, the limiting action is afforded by cyclically reversing the polarity of the D. C. voltage applied to the field windings 13 and 14 rather than by cyclically placing resistance in series with the field windings. In this connection reversing switches 41 and 42 are operated by the fork 12. When the switches 41 and 42 are in the right hand position, one polarity is applied to the field coils and when they are in the left position, the opposite polarity is applied. The manner of operation of the arrangement of Fig. 7 is substantially the same as that described above.

Figure 8:
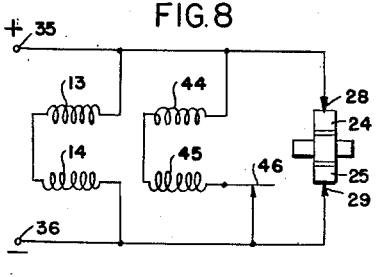
Fig. 8 is a diagrammatic view illustrating "bucking" field coils cyclically controlled by the switch means.

Fig. 8 utilizes "bucking" field coils 44, 45 and a switch means 46 for limiting the amplitude of vibration of the vibrating fork. In this connection the field coils 44, 45 are magnetically associated with the tuning fork 12 and operate to produce a magnetic force opposite to that produced by the field coils 13 and 14. The switch means 46 is operated by the vibrating fork and, as the amplitude of vibration of the fork increases, the "bucking" field coils are cyclically energized in proportion to the amplitude of vibration. The manner of operation of this arrangement is substantially the same as that described above.

Figure 9:
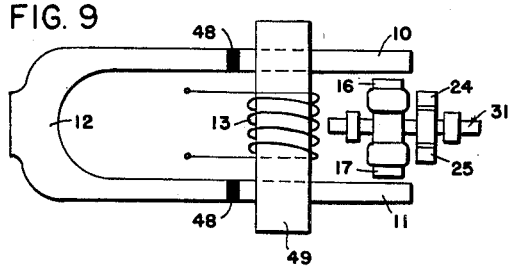
Fig. 9 is a diagrammatic illustration similar to Fig. 1 wherein a core is used for completing the magnetic path of the field structure independently of the vibrating fork.
Figure 10:
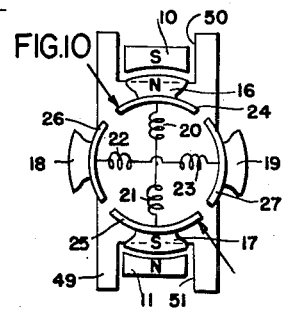
Fig. 10 is an end elevational view of Fig. 9.

To improve the frequency stability of the vibrating fork, it is preferable to utilize a fork of constant modulus alloy having good temperature stability, but such a fork ordinarily would not have a high magnetic permeability and thus would not produce a high strength field. To remedy this and provide for high magnetic efficiency, a separate core for forming the magnetic path of the field structure may be provided as is illustrated in Figs. 9 and 10. Here, the fork 12 is made of constant modulus alloy for frequency stability and it carries the field poles 10 and 11 through suitable magnetic insulation 48. The field poles 10 and 11 may, therefore, be made of magnetic iron having a high magnetic permeability and these field poles may be magnetically associated with a core 49. The field windings 13 may be wound on the core 49 inducing the field and the core 49 may be provided with slots 50 and 51 for movably receiving the field poles 10 and 11 vibrated by the fork 12. The field poles 10 and 11 are magnetically associated with the core 49 by reason of their location within the slots 50 and 51. Greater stability is obtained by the arrangement of Figs. 9 and 10 than by the arrangement of Figs. 1 to 5. The manner of operation of Figs. 9 and 10 is the same as that described above.

Figure 11:
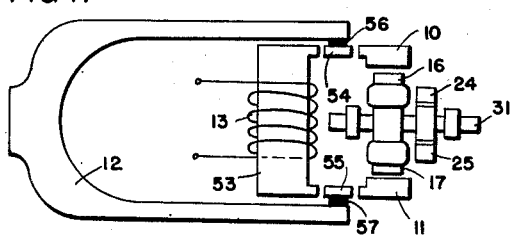
Fig. 11 is a diagrammatic view of another form of the motor wherein a gap is provided in the magnetic circuit of the field structure and wherein this gap is controlled by a magnetic bridging member operated by a vibrating fork.
Figure 12:
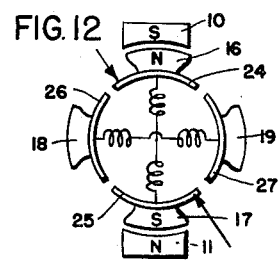
Fig. 12 is an end elevational view of Fig. 11.

Another form of the invention is illustrated in Figs. 11 and 12. In this arrangement the field poles 10 and 11 are stationary and gaps are located between the field poles 10 and 11 and the core 53 of the field structure. These gaps are bridged by magnetic bridging members 54 and 55 which in turn are carried through magnetic insulation 56 and 57 by the ends of the vibrating fork 12. As the magnetic bridging members 54 and 55 are vibrated in the gaps by the fork 12, the magnetic reaction between the field poles 10 and 11 and the armature poles is cyclically varied to obtain synchronous and constant speed operation of the motor. Outside of using magnetic bridging members in lieu of vibrating field poles, the manner of operation is the same as that discussed above.

Figure 13:
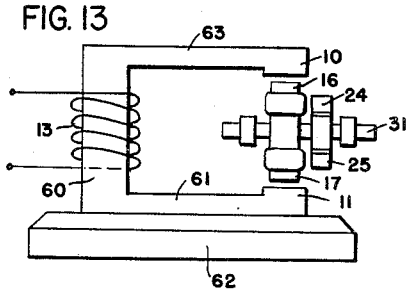
Fig. 13 is a diagrammatic view illustrating another form of the motor wherein a field pole is vibrated by a vibrating reed rather than by a vibrating fork.
Figure 14:
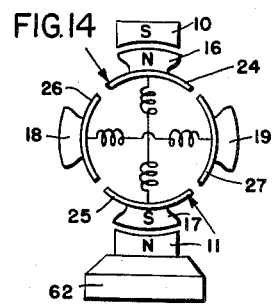
Fig. 14 is an end elevational view of Fig. 13.
Figure 16:
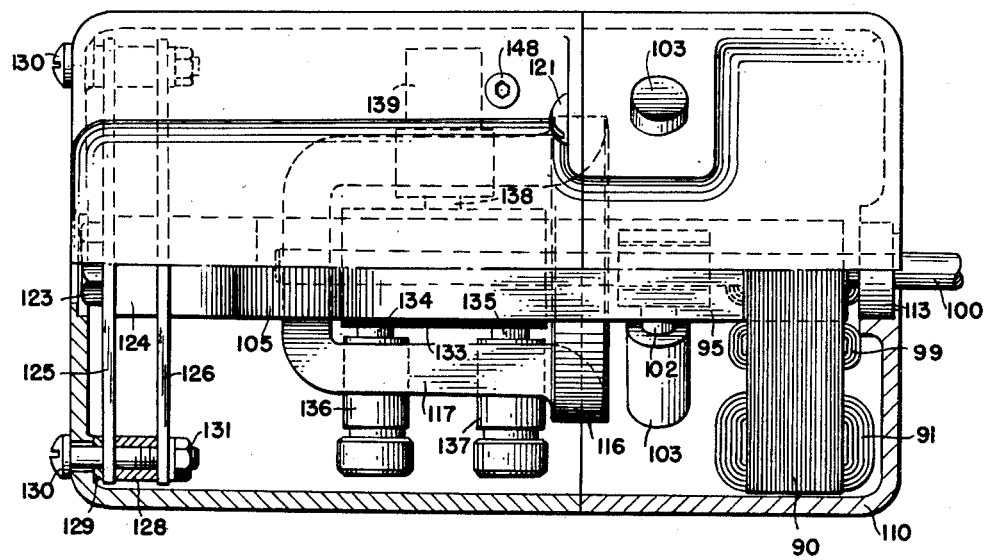
Fig. 16 is a top plan view, partly in section, illustrating a commercial embodiment of the constant speed D. C. motor of this invention.
Figure 17:
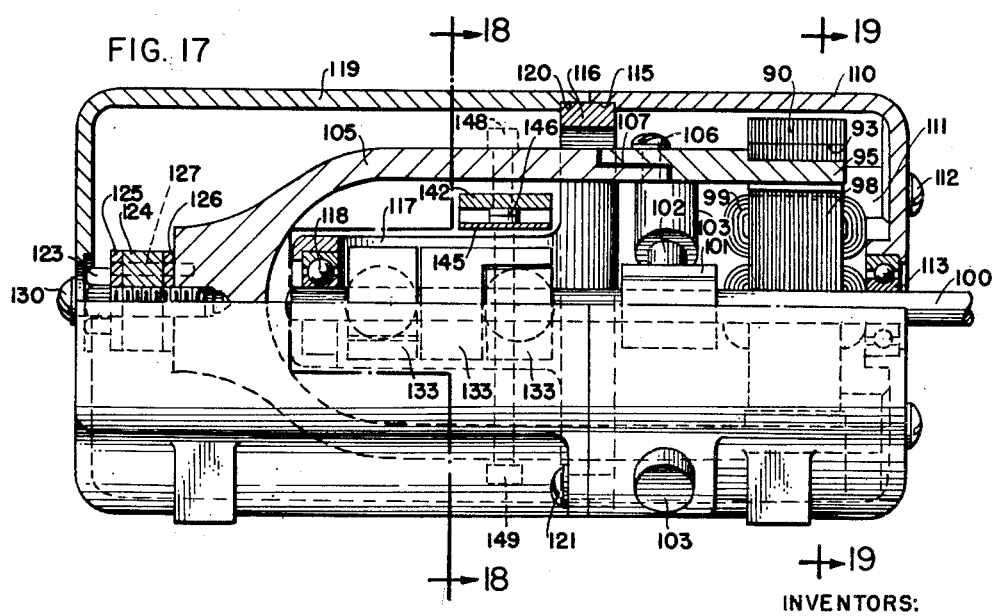
Fig. 17 is a side elevational view, partly in section, of the motor illustrated in Fig. 16.
Figure 18:
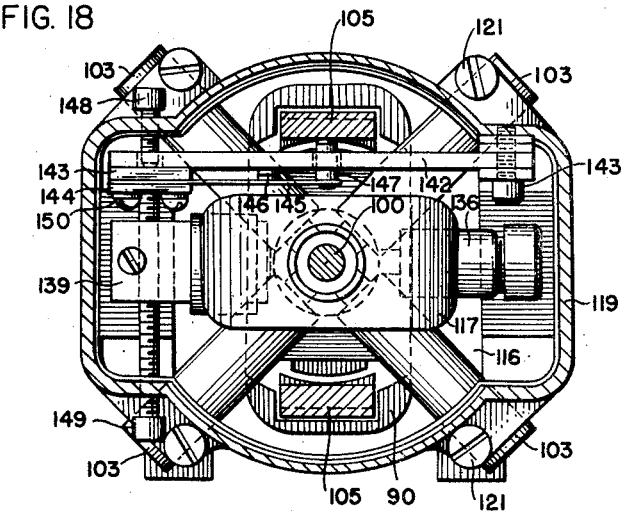
Fig. 18 is a vertical sectional view taken substantially along the line 18—18 of Fig. 17.
Figure 19:
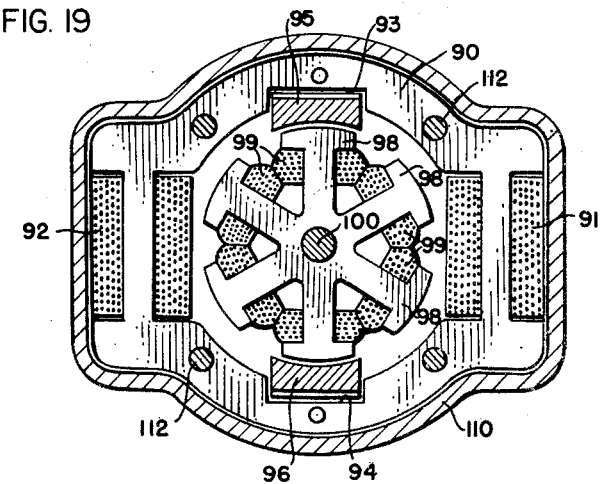
Fig. 19 is a vertical sectional view taken substantially along the line 19—19 of Fig. 17.

Figs. 13 and 14 illustrate an arrangement wherein a vibrating reed is utilized in place of a vibrating fork. In this arrangement the field structure includes legs 60 and 61, the leg 61 carrying the field pole 11. The legs 60 and 61 of the core structure are suitably mounted on a base 62 to hold the same rigid. The leg 60 carries a vibrating reed 63 which in turn carries at its extremity the field pole 10. The reed 63 vibrates the field pole 10 to cause the armature to rotate in synchronism with the vibrating reed to obtain constant speed operation of the motor. The manner of operation of the arrangement of Figs. 13 and 14 is the same as that discussed above. Of course, the motors of Figs. 9 to 14 may be provided with the limiter switch means described in connection with Figs. 1 to 8.

Figure 15:
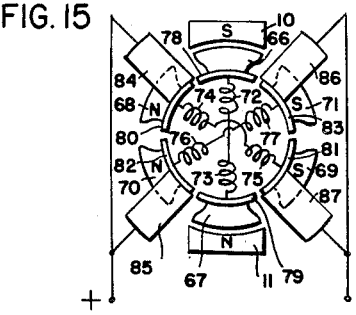
Fig. 15 is a diagrammatic end elevational view of the motor of this invention utilizing an armature with cross connected brushes.

Fig. 15 diagrammatically illustrates a motor which may take the form of the motors illustrated in Figs. 1 to 14, wherein a special commutator arrangement is provided. In Fig. 15 the field poles are designated at 10 and 11. The armature is shown to include three pairs of opposed armature poles 66, 67 and 68, 69 and 70, 71. Armature windings 72, 73, 74, 75, 76 and 77 are associated, respectively, with the armature poles 66, 67, 68, 69, 70 and 71 and are connected, respectively, to commutator pieces 78, 79, 80, 81, 82 and 83. Two pairs of cross connected brushes 84, 85 and 86, 87 cooperate with the commutator segments. With the parts in the position illustrated in Fig. 15, the brushes 84 and 85 are engaging the commutator segments 80 and 82, respectively, and the brushes 86 and 87 are engaging the commutator segments 83 and 81, respectively. Thus, the armature poles 68 and 70 are north and the armature poles 69 and 71 are south. The armature pole 68 is being attracted by the field pole 10 and the armature pole 71 is being repelled by the field pole 10. Likewise, armature pole 69 is being attracted by the field pole 11 and armature pole 70 is being repelled by field pole 11. This causes rotation of the armature in a clockwise direction as viewed in Fig. 15. As shown in Fig. 15, the commutator segments 78 and 79 are not engaging any of the brushes. However, upon slight rotation from the position shown in Fig. 15 in a clockwise direction, commutator segment 78 engages brush 86 and commutator segment 79 engages brush 85 to cause the armature pole 66 to become south and the armature pole 67 to become north. The field poles 10 and 11 will, therefore, operate to repel the armature poles 66 and 67. This causes continuing torque in the rotation of the armature. Since the polarity of the armature poles is reversed at the time that they come into substantial alignment with the field poles 10 and 11, there is a repelling reaction on the field poles 10 and 11. In this way the field poles and hence the vibrating fork are urged in both directions by the reaction between the field poles and the armature poles. This provides, in addition, better operation of the vibrating fork. Outside of this additional feature brought about by the cross connected brushes, the manner of operation of the arrangement of Fig. 15 is substantially the same as that discussed above.

Figs. 16 to 19 illustrate a commercial embodiment of the motor of this invention. Here, the field structure includes a substantially rectangular laminated core 90. Two of the opposed legs of the core 90 carry field windings 91 and 92. The other two legs of the core 90 are provided with internal slots 93 and 94 for receiving vibrating field poles 95 and 96, the field poles being magnetically associated with the core. The armature includes, as illustrated, three pairs of laminated armature poles 98 which in turn carry armature windings 99. The armature is carried by the shaft 100. The shaft 100 also carries a plurality of commutator segments 101 connected to the armature windings 99. The commutator segments 101 are engaged by brushes 102 carried by suitable carriers 103. Four brushes are utilized for the six armature poles so that the arrangement is similar to that diagrammatically illustrated in Fig. 15. A vibrating fork 105 carries at its forked ends the field poles 95 and 96, the field poles being secured thereto by screws 106 and magnetic insulation 107.

A cup-shaped housing member 110 encloses the field armature and commutator parts. The field core 90 is secured to the housing member 10 by spacers 111 and screws 112. The housing member also carries a bearing 113 for journalling one end of the armature shaft 100. The housing member 110 is provided with an internal shoulder 115 for receiving a partition member 116. The partition member 116 is provided with an extension 117 which carries a bearing 118 for journaling the other end of the armature shaft 100.

A second cup-shaped housing member 119 encloses the vibrating fork 105 and it is provided with an internal shoulder 120 for also receiving the partition member 116. The second housing member 119 is secured to the first housing member 110 by screws 121.

The fork 105 is secured through a bolt 123 and a spacer 124 to a pair of bars 125 and 126, the fork being prevented from rotating with respect to the bars 125 and 126 by means of a dowel pin 127. The bars 125 and 126 are secured through spacers 128 and 129, screws 130, and nuts 131 to the housing member 119. This mounting arrangement for the vibrating fork 105 provides for relatively free vibration of the fork.

The motor of Figs. 16 to 19 is particularly adapted for operating a rotary switching mechanism in the nature of a single pole, double throw switch for producing alternating current of constant frequency. In this connection the motor shaft 100 carries single pole, double throw switching segments 133 which cooperate with end brushes 134, 135 carried by carriers 136 and 137 mounted in the extension 117 and with a center brush 138 carried by a carrier 139 mounted in the extension 117.

A bar 142 is carried at one end through a screw 143 by the housing member 119. The other end of the bar 142 carries a spring arm 145 which is secured by screws 150 and insulating pads 143 and 144 to the bar 142. The bar 142 and spring arm 145 carry cooperating switch contacts 146. The spring member 145 also carries a button 147 extending upwardly through a hole in the bar 142 into engagement with the vibrating fork 105. Thus, as the fork 105 vibrates, the switch contacts 146 open and close to limit the extent of vibration of the fork. A screw 148 extends downwardly through the housing member 119 into engagement with the insulating pad 143 and another screw 149 extends upwardly through the housing member 119 into engagement with the insulating pad 144. By adjusting the screws 148 and 149, the free end of the bar 142 may be adjusted for regulating the opening and closing points of the switch contacts 146.

The motor illustrated in Figs. 16 to 19 may be wired in any suitable manner, such as is illustrated in Figs. 1 to 6 or 15, and the motor operates in the manner discussed above.

While for purposes of illustration several forms of this invention have been disclosed, other forms thereof may become apparent to those skilled in the art upon reference to this disclosure and, therefore, this invention is to be limited only by the scope of the appended claims.

We claim as our invention:

1. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a cyclically operating mechanism mechanically associated with the magnetic circuit of the field structure for cyclically varying at a fixed frequency the magnetic force between the field poles and the armature poles to cause the armature to rotate in synchronism with said cylically operating mechanism.

2. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism.

3. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a vibrating mechanism for mechanically vibrating at least one of the field poles at a fixed frequency toward and away from the armature poles for varying at a fixed frequency the magnetic force between the field poles and the armature poles to cause the armature to rotate in synchronism with said vibrating mechanism.

4. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a vibrating fork mechanically vibrating at least a portion of the magnetic circuit of the field structure at a fixed frequecny for varying at a fixed frequency the magnetic force between the field poles and the armature poles to cause the armature to rotate in synchronism with said vibrating fork.

5. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a vibrating reed mechanically vibrating at least a portion of the magnetic circuit of the field structure at a fixed frequency for varying at a fixed frequency the magnetic force between the field poles and the armature poles to cause the armature to rotate in synchronism with said vibrating reed.

6. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a vibrating fork carrying the field poles for mechanically vibrating the same at a fixed frequency toward and away from the armature poles for varying at a fixed frequency the magnetic force between the field poles and the armature poles to cause the armature to rotate in synchronism with said vibrating fork.

7. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a vibrating reed carrying one of the field poles for mechanically vibrating the same at a fixed frequency toward and away from the armature poles for varying at a fixed frequency the magnetic force between the field poles and the armature poles to cause the armature to rotate in synchronism with said vibrating fork.

8. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a gap in the magnetic circuit of the field structure, a magnetic bridging member for the gap, and a vibrating mechanism mechanically vibrating the magnetic bridging member at a fixed frequency for varying at a fixed frequency the magnetic force between the field poles and the armature poles to cause the armature to rotate in synchronism with said vibrating mechanism.

9. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a pair of gaps in the magnetic circuit of the field structure, a magnetic bridging member for each gap, and a vibrating fork mechanically vibrating the magnetic bridging members at a fixed frequency for varying at a fixed frequency the magnetic force between the field poles and the armature poles to cause the armature to rotate in synchronism with said vibrating fork.

10. A constant speed D. C. motor comprising, a field structure having a magnetic circuit including a magnetic core, opposed poles magnetically associated with the core and winding means for the core energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, at least one of said field poles being movable with respect to the core toward and away from the armature poles, and a vibrating mechanism mechanically vibrating the movable field poles at a fixed frequency for varying at a fixed frequency the magnetic force between the field poles and the armature poles to cause the armature to rotate in synchronism with said vibrating mechanism.

11. A constant speed D. C. motor comprising, a field structure having a magnetic circuit including a magnetic core, opposed poles magnetically associated with the core and winding means for the core energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, said field poles being movable with respect to the core toward and away from the armature poles, and a vibrating fork carrying the field poles for vibrating the same at a fixed frequency for varying at a fixed frequency the magnetic force between the field poles and the armature poles to cause the armature to rotate in synchronism with said vibrating fork.

12. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism, and means including switch means operated by the vibrating mechanism for cyclically decreasing the effect of the motor windings in proportion to the amplitude of vibration of the vibrated portion of the field structure.

13. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism, and means including switch means in circuit with the motor windings and operated by the vibrating mechanism for cyclically decreasing the D. C. voltage applied to the motor windings in proportion to the amplitude of vibration of the vibrated portion of the field structure.

14. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism, bucking windings for the magnetic circuit of the field structure, and switch means in circuit with the bucking windings and operated by the vibrating mechanism for cyclically energizing the same in proportion to the amplitude of vibration of the vibrated portion of the field structure.

15. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism, and means including switch means in series with the field windings and operated by the vibrating mechanism for cyclically decreasing the D. C. voltage applied to the field windings in proportion to the amplitude of vibration of the vibrated portion of the field structure.

16. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism, and means including switch means in series with the armature windings and operated by the vibrating mechanism for cyclically decreasing the D. C. voltage applied to the armature windings in proportion to the amplitude of vibration of the vibrated portion of the field structure.

17. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism, and means including switch means in series with the field and armature windings and operated by the vibrating mechanism for cyclically decreasing the D. C. voltage applied to the field and armature windings in proportion to the amplitude of vibration of the vibrated portion of the field structure.

18. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism, and switch means in circuit with the field windings and operated by the vibrating mechanism for cyclically reversing the D. C. voltage applied to the field windings in proportion to the amplitude of vibration of the vibrated portion of the field structure.

19. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator having segments connected to the armature windings and cross connected brushes engaging the segments and angularly located with respect to the field poles to cause the armature poles magnetically to cooperate with the field poles for rotating the armature and during the rotation of the armature to cause the armature and field poles to attract each other until they are in substantial alignment and then to repel each other.

20. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator having segments connected to the armature windings and cross connected brushes engaging the segments and angularly located with respect to the field poles to cause the armature poles magnetically to cooperate with the field poles for rotating the armature and during the rotation of the armature to cause the armature and field poles to attract each other until they are in substantial alignment and then to repel each other, and a vibrating mechanism for mechanically vibrating at least a portion of the magnetic circuit of the field structure at a fixed frequency for varying at a fixed frequency the magnetic force between the field poles and the armature poles to cause the armature to rotate in synchronism with said vibrating mechanism.

21. A constant speed D. C. motor comprising, a field structure having a magnetic circuit including opposed poles and windings for the magnetic circuit energizable from a D. C. voltage source, a rotatable armature having opposed poles and windings for the poles energizable from a D. C. voltage source, said armature poles being magnetically associated with and affected by the field poles, a commutator having segments connected to the armature windings and cross connected brushes engaging the segments and angularly located with respect to the field poles to cause the armature poles magnetically to cooperate with the field poles for rotating the armature and during the rotation of the armature to cause the armature and field poles to attract each other until they are in substantial alignment and then to repel each other, and a vibrating fork carrying the field poles for mechanically vibrating the same at a fixed frequency toward and away from the armature poles for varying at a fixed frequency the magnetic force between the field poles and the armature poles to cause the armature to rotate in synchronism with said vibrating fork.

22. A constant speed D. C. motor comprising, a field structure having a substantially rectangular laminated core, a field winding on each of two opposed legs of the core and energizable from a D. C. voltage source, an internal slot in each of the other two opposed legs of the core and a pole in each slot magnetically associated with the core and movable inwardly and outwardly with respect to the core, a rotatable armature within the core and having opposed poles and windings for the poles energizable from a D. C. voltage source, said armature poles being magnetically associated with and affected by the field poles, a commutator for the armature windings to cause the armature poles magnetically to cooperate with the field poles for rotating the armature, and a vibrating fork carrying the movable field poles for mechanically vibrating the same at a fixed frequency toward and away from the armature poles for varying at a fixed frequency the magnetic force between the field poles and the armature poles to cause the armature to rotate in synchronism with said vibrating fork.

23. A constant speed D. C. motor comprising, a field structure having a substantially rectangular laminated core, a field winding on each of two opposed legs of the core and energizable from a D. C. voltage source, an internal slot in each of the other two opposed legs of the core and a pole in each slot magnetically associated with the core and movable inwardly and outwardly with respect to the core, a rotatable armature within the core and having opposed poles and windings for the poles energizable from a D. C. voltage source, said armature poles being magnetically associated with and affected by the field poles, a commutator having segments connected to the armature windings and cross connected brushes engaging the segments and angularly located with respect to the field poles to cause the armature poles magnetically to cooperate with the field poles for rotating the armature and during the rotation of the armature to cause the armature and field poles to attract each other until they are in substantial alignment and then to repel each other, and a vibrating fork carrying the movable field poles for mechanically vibrating the same at a fixed frequency toward and away from the armature poles for varying at a fixed frequency the magnetic force between the field poles and the armature poles to cause the armature to rotate in synchronism with said vibrating fork.

24. A constant speed D. C. motor comprising, a field structure having a substantially rectangular laminated core, a field winding on each of two opposed legs of the core and energizable from a D. C. voltage source, an internal slot in each of the other two opposed legs of the core and a pole in each slot magnetically associated with the core and movable inwardly and outwardly with respect to the core, a rotatable armature within the core and having opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating fork carrying the movable field poles for mechanically vibrating the same at a fixed frequency toward and away from the armature poles for varying at a fixed frequency the magnetic force between the field poles and the armature poles to cause the armature to rotate in synchronism with said vibrating fork, and means including switch means operated by the vibrating fork for cyclically decreasing the effect of the motor windings in proportion to the amplitude of vibration of the vibrating fork.

25. A constant speed D. C. motor comprising a field structure having a substantially rectangular laminated core, a field winding on each of two opposed legs of the core and energizable from a D. C. voltage source, an internal slot in each of the other two opposed legs of the core and a pole in each slot magnetically associated with the core and movable inwardly and outwardly with respect to the core, a rotatable armature within the core and having a shaft, opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating fork carrying the movable field poles for mechanically vibrating the same at a fixed frequency toward and away from the armature poles for varying at a fixed frequency the magnetic force between the field poles and the armature poles to cause the armature to rotate in synchronism with said vibrating fork, a first housing member, means for securing the field structure in the first housing member, a bearing in the housing member journaling one end of the armature shaft, a second housing member secured to the first housing member, means for securing the vibrating fork in the second housing member with the ends of the vibrating fork extending into the first housing member, a partition member between the two housing members and having a bearing for journaling the other end of the armature shaft.

26. A constant speed D. C. motor comprising, a field structure having a substantially rectangular laminated core, a field winding on each of two opposed legs of the core and energizable from a D. C. voltage source, an internal slot in each of the other two opposed legs of the core and a pole in each slot magnetically associated with the core and movable inwardly and outwardly with respect to the core, a rotatable armature within the core and having a shaft, opposed poles and windings for the poles energizable from a D. C. voltage source, said armature poles being magnetically associated with and affected by the field poles, a commutator for the armature windings to cause the armature poles magnetically to cooperate with the field poles for rotating the armature, a vibrating fork carrying the movable field poles for mechanically vibrating the same at a fixed frequency toward and away from the armature poles for varying at a fixed frequency the magnetic force between the field poles and the armature poles to cause the armature to rotate in synchronism with said vibrating fork, means including switch means operated by the vibrating fork for cyclically decreasing the effect of the motor windings in proportion to the amplitude of vibration of the vibrating fork, a first housing member, means for securing the field structure in the first housing member, a bearing in the housing member journaling one end of the armature shaft, a second housing member secured to the first housing member, means for securing the vibrating fork in the second housing member with the ends of the vibrating fork extending into the first housing member, a partition member between the two housing members and having a bearing for journaling the other end of the armature shaft, and means for mounting the switch means in the second housing member.

ROBERT M. VIRKUS.
MYRON L. ANTHONY.

No references cited.